No. 785,184. PATENTED MAR. 21, 1905.
A. T. SAUNDERS.
MANUFACTURE OF PLAYING BALLS.
APPLICATION FILED MAY 16, 1903.

Witnesses,

Inventor,
Addison T. Saunders

No. 785,184. Patented March 21, 1905.

UNITED STATES PATENT OFFICE.

ADDISON T. SAUNDERS, OF AKRON, OHIO.

MANUFACTURE OF PLAYING-BALLS.

SPECIFICATION forming part of Letters Patent No. 785,184, dated March 21, 1905.

Application filed May 16, 1903. Serial No. 157,363.

*To all whom it may concern:*

Be it known that I, ADDISON T. SAUNDERS, a citizen of the United States, residing at Akron, in the county of Summit and State of Ohio, have invented certain new and useful Improvements in the Manufacture of Playing-Balls, of which the following is a specification.

My invention relates to balls such as are used in golf and similar games, although features of my invention are equally applicable to and advantageous in connection with other kinds of playing-balls; and the general object of my invention is to produce a playing-ball through a novel process of manufacture which insures therein greater strength, durability, and responsiveness in the required ways to the various kinds of strokes and impacts to which they are subjected in play.

More specifically, a leading object of my invention is to provide an improved ball of that variety used in the game of golf characterized by the possession of a pneumatic core and by a novel process of manufacture of said ball, and more particularly of its compressed-air holding or retaining element or elements, to produce a ball which shall be characterized by a high degree of resiliency under the heavy strokes which call into action its pneumatic core, and by a capacity to maintain unimpaired and in uniform degree such resiliency throughout the life of the ball.

In carrying out the object of my invention I provide the ball with an inner air-retaining core or shell of a novel composition material, which I have found by experience to possess absolute imperviousness to compressed air, and in association therewith employ certain materials to form the intermediate shell or body portion of the ball and a wear-resisting covering, and such a ball, as an article of manufacture, constitutes the subject-matter of a companion application filed concurrently herewith, Serial No. 157,362.

My present invention, in contradistinction to the article itself, relates to a novel process of manufacture through the carrying out of which my improved playing-balls may be produced, and in the accompanying drawings and the subjoined description thereof I have set forth a golf-ball, illustrating and describing in connection therewith the various operations and steps which I employ in carrying out the complete manufacture of the said ball.

Figure 1:
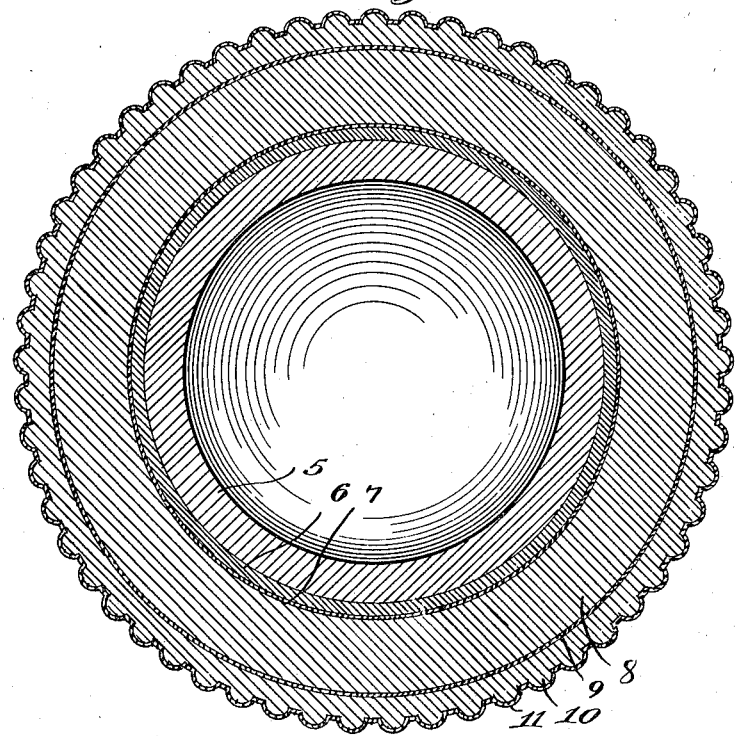
Figure 2:
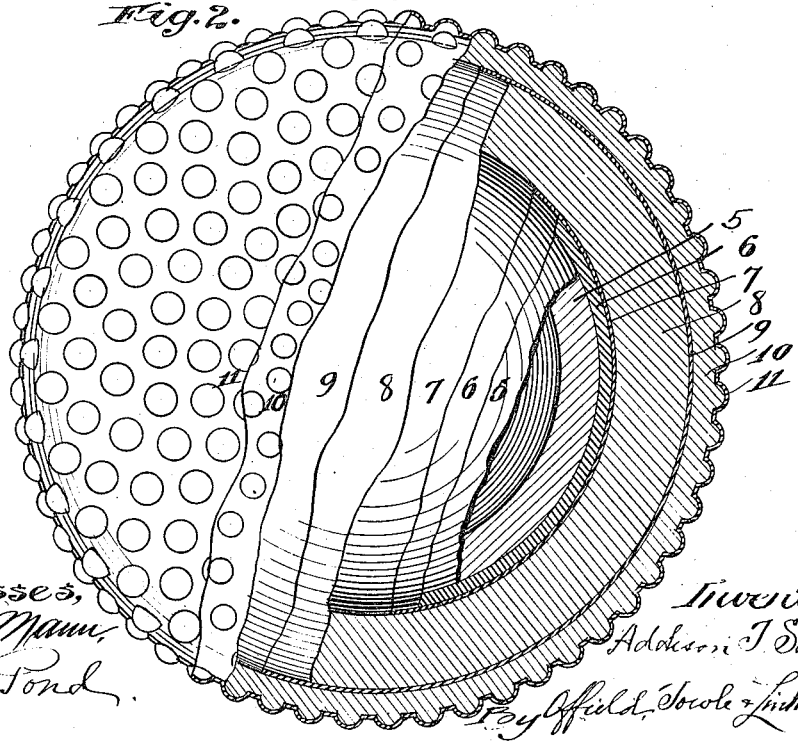

Referring to the drawings, Figure 1 is a central transverse sectional view through a ball made in accordance with my present process of manufacture; and Fig. 2 is a view, partly in elevation and partly in broken section, of the same.

Proceeding to a detail description of the process of manufacture under and by which I produce the new and improved ball shown in the drawings, it may be premised that the innermost member of the ball, which owing to its pneumatic character constitutes a very important element thereof, is composed of a compound of gelatin, preferably gelatin and glycerin, to which is added a percentage of albumen, which latter by virtue of its action in coagulating above certain temperatures imparts to the other ingredients of the compound stability and permanency of form at temperatures under which they would otherwise melt. The compound referred to as forming this air-tight envelop of gelatin and glycerin or gelatin, glycerin, and albumen constitutes the subject-matter of two applications heretofore filed by me on the 22d day of April, 1903, Serial Nos. 153,750 and 153,751, and for the purposes of this application it will suffice to say that for the formation of this air-tight envelop I preferably mold from a sheet of the air-proof compound a pair of hollow hemispherical segments by pressing the required amount of the sheeted compound heated to about 130° Fahrenheit in a suitable mold, removing the hemispherical segments when cold, and then joining the two together, preferably by heating their edges through contact with a hot plate and then bringing them into contact, thus forming a hollow sphere, which is indicated in the drawings by the reference-numeral 5. I next inclose this shell in a spherical layer of rubber formed of two segments, each somewhat exceeding a hollow hemisphere, so that their edge portions, tapered or beveled for that purpose, may overlap, together making the same thickness as the rest of the layer. Having laid this layer composed of the rubber segments upon the inner air-tight envelop and united their overlapping margins with a quick-curing cement which cures under the subsequent heat of the tumbling-table, I next inclose them in a spherical mold of an interior capacity which just receives and fits the core laid up as above described. This spherical mold, being spherical without as well as within, is then tumbled upon a heated plate with these objects and results. As the temperature of the gelatin member rises it softens and sets itself upon the inner surface of the rubber member, adhering thereto, and the seam or line of junction of the gelatin heals perfectly, making a continuous seamless air-tight inner wall. If desired, as an optional step in the process of manufacture the gelatin-compound core may be made continuous and seamless by tumbling the two halves in a spherical mold on a heated surface independent of the rubber segments which overlie it and previous to inclosing it therein. The expansion of the contained air under the effect of the heat presses the core outward upon the inner surface of the spherical mold, so that the core as a whole is reset to this form, correcting any slight distortion in the previous laying of the parts. The even tumbling of the spherical mold and its contents prevents the running or displacement of the gelatin compound while in a flowing state, and the tumbling is continued until the albumen in the gelatin compound is coagulated by the heat. This renders the compound non-fluent not only under this degree of heat, but in the subsequent operation of curing on the cover. The office of this layer or shell of rubber (designated by 6) is to prevent the gelatin compound from being forced out through or into the interstices of the wall of fiber by the compressed air when charged therewith and also to strengthen and support the gelatin core against the compressing action of the yarn in the winding operation. As will be readily understood, this layer adds in proportion to its thickness and resilient character to the resiliency of the ball, acting in harmony with the compressed air, by which it is supported when the ball is charged therewith, and it is therefore practicable to vary the responsiveness of balls to various impacts by varying the character of this layer and its thickness relative to other portions, care being had to so regulate the gravity of those portions where there is a latitude in that quality as to produce a ball of the desired gravity. The tumbling operation having been completed, the spherical mold is then cooled and the core removed. The cementing together of the overlapping annular flaps may be postponed until after the tumbling, if desired, in which case it is now done. The core is next coated with a thin covering of glue containing just sufficient glycerin to prevent its being brittle when dry. This coating is indicated in the drawings at 7 and serves the double purpose of preventing the benzin of the rubber cement or compound used in the subsequent operation of winding from penetrating the rubber-compound member of the core and of further stiffening the core for the winding. After this coat of glue is dry the core as thus far formed is wound with a cotton yarn, which during the winding operation is laid in rubber cement or compound consisting preferably of caoutchouc, benzin, and litharge, mixed in about the proportions of ten pounds caoutchouc, thirteen gallons benzin, and nine pounds litharge. It may be noted that the office of the litharge is to afford the required weight and also body to fill the interstices between the threads. It is evident that other minerals may of course be used for this purpose, while the ingredients of the cement may vary in relative amounts and in total amount used according to the desired rigidity to be imparted to the fibrous wall. The cement should lie freely enough, however, to make an effective filling of the yarn and to form a union with a layer of quick-curing cement, which is next laid on to insure a firm adhesion of the cover, this layer being indicated at 9 in the drawings. This body of cement-filled fiber is designated at 8 and, as will be seen, constitutes in a golf-ball the principal and major portion of the body or shell of the ball. When the cement or compound used in the winding is practically dry, the partially-finished ball is charged highly with compressed air, which charging operation is preferably performed through the agency of a hypodermic needle attached to a suitable source of pressure, such as a compressed-air reservoir of large capacity relatively to the capacity of the core of the ball, the needle being preferably entered obliquely, so that when withdrawn the internal pressure of the air may the more effectively close the puncture in the gelatin compound, which it does instantly. The compound is self-sealing under the heavy pressure and holds the air indefinitely. It may be remarked in this connection that it is practicable to use a gelatin compound of a greater stiffness than will seal cold (this greater stiffness being desirable in strengthening the core against the compressing action of the winding, as above described) by warming the ball sufficiently to soften the gelatin compound just prior to and for this charging operation, such warming bringing it to the same self-sealing condition which it has cold when compounded less stiff. The charged ball is next surrounded by a layer or layers of rubber compound to form the outer cover, this latter, united to the mass of yarn laid in cement, being brought into surer union by being rolled under pressure, whereby any air which may lie between the surface of the winding and the raw cover is thus forced out at the seams or when it shows as blisters may be gotten rid of by puncturing the cover to release it. The rubber-compound cover is then cured by being subjected to pressure in a heated mold of perfect internal sphericity and pebbled or brambled according to the desired external finish to be given to the ball. The cover-stock should preferably be quick-curing and only slightly resilient, the best results being obtained where it is practically dead. This deadness of the cover-stock may be obtained by a suitable admixture of the usual minerals. The rubber cover thus formed is indicated at 10 in the drawings.

During the curing on of the cover the heat employed therefor softens the inner gelatin air-holding envelop somewhat, whereby the needle puncture in addition to having been mechanically pressed shut is perfectly healed, making the air-envelop continuous and unbroken throughout.

One advantage of employing a quick-curing compound for the cover is that the strength of the fibrous-wound portion is less impaired than in a long heat. Another advantage lies in the fact that the heat is not sufficient or sufficiently long maintained to impair or burn the gelatin member. To confine the effect of the heat as nearly as possible to the surface or cover to be cured, the mold is heated before the ball is placed therein.

Finally the ball is treated to a surface-covering of paint, preferably white, (indicated at 11,) as is usual with golf-balls, to give the ball a complete and finished appearance and to enable it to be more readily seen and found in play.

In a pending application filed by me on the 11th day of August, 1902, Serial No. 119,242, on a new and improved process in producing playing-balls I have disclosed a process of manufacture characterized principally by the formation of a body and outer covering around an internal spherical hollow shell of rubber and the rendering of said rubber shell air-tight by the introduction to the latter of sealing material in fluent form, which is distributed over the inner surface by a tumbling operation to form an impervious coating or lining for said shell. My present invention is distinguished therefrom principally in the entire omission of the last-mentioned operation, owing to the fact that the shell constituting the core is in the present case produced from material which is in itself air-proof without requiring a surface sealing or coating thereon. My present invention in minor respects presents also improvements in the manner of assembling and applying the intermediate body portion and the outer wear-resisting covering.

I claim—

1. In a process of producing playing-balls, the following operations which consist in inclosing within a hollow sphere of suitable material a lining of air-proof material in a non-flowing state, heating said sphere, and tumbling the same while hot, substantially as described.

2. In a process of producing playing-balls, the following operations which consist in surrounding a lining of air-proof material in a non-flowing state with a number of segments of rubber or other suitable material having their meeting edges beveled or graduated so as to overlap and form a hollow sphere having walls of uniform thickness, inclosing this sphere in a suitable mold, and tumbling the same while hot, substantially as described.

3. A process in producing playing-balls which consists in forming a unitary air-proof hollow sphere from suitable material, winding about said sphere a shell constituting the body portion of the ball, then charging said inner shell with an aeriform fluid under pressure, and finally surrounding said shell by a wear-resisting covering.

4. A process in producing playing-balls which consists in molding a unitary air-proof hollow sphere from suitable material, winding about the same a fibrous shell constituting the body portion of the ball, and charging said inner shell with an aeriform fluid under pressure, and finally curing upon said shell an outer wear-resisting covering.

5. A process in producing playing-balls which consists in molding a pair of hollow hemispheres from suitable air-proof material, then uniting said hemispheres by edgewise adhesion, then winding about the unitary sphere thus formed a fibrous shell, then charging the inner air-proof sphere with an aeriform fluid under pressure, and finally applying to said fibrous shell a wear-resisting covering.

6. A process in producing playing-balls which consists in forming a unitary air-proof hollow sphere from suitable material, surrounding said sphere by a form-retaining envelop, winding about said envelop a fibrous shell, charging the ball thus formed with air under pressure, and finally applying thereto an outer wear-resisting covering.

7. A process in producing playing-balls which consists in molding a unitary air-proof hollow sphere from suitable material, surrounding said sphere by a form-retaining envelop, winding about said envelop a fibrous shell, incorporating into the latter during the winding operation an adhering and weight-giving substance, charging the ball thus formed with air under pressure, and finally applying thereto an outer wear-resisting covering.

8. A process in producing playing-balls which consists in molding a hollow sphere from suitable air-proof material, surrounding said sphere by a form-retaining envelop, tumbling the core thus formed on a hot surface to cause the inner sphere and its envelop to adhere, applying to the stiffened core a shell and a wear-resisting covering, and charging said hollow sphere during the process of manufacture with air under pressure.

9. A process in producing playing-balls which consists in molding a pair of hollow hemispheres from suitable air-proof material, placing them edge to edge and inclosing them in a stiffened envelop, tumbling the core thus formed upon a hot surface to adhere the edges of the hemispheres and the contacting surfaces of the latter and the envelop, applying to the stiffened core a shell and a wear-resisting covering, and inflating the hollow sphere during the process of manufacture.

10. A process in producing playing-balls which consists in molding a pair of hollow hemispheres from suitable air-proof material, placing them edge to edge and inclosing them in a stiffened envelop, tumbling the core thus formed upon a hot surface, applying to said envelop a gelatinous coating, winding about the latter a fibrous shell and simultaneously incorporating into the latter an adhering and weight-giving substance, charging the ball thus formed with air under pressure, and finally applying to the fibrous shell an outer wear-resisting covering.

11. A process in producing playing-balls which consists in molding a pair of hollow hemispheres from suitable air-proof material, placing them edge to edge and inclosing them in a stiffened envelop, tumbling the core thus formed upon a hot surface, applying to said envelop a gelatinous coating, winding about the latter a fibrous shell and simultaneously incorporating into the latter an adhering and weight-giving substance, charging the ball thus formed with air under pressure, laying upon the surface of said fibrous shell sheets of rubber compound, and finally curing the latter on under pressure and heat.

12. A process in producing playing-balls which consists in molding a pair of hollow hemispheres from suitable air-proof material, softening their edges by heat and adhering them to form a unitary hollow sphere, inclosing said sphere in a stiffened envelop, tumbling the core thus formed upon a hot surface, coating said envelop with a gelatinous substance, winding about the latter a fibrous shell and simultaneously incorporating therewith an adhering and weight-giving substance, surrounding the latter with a coating of quick-curing cement, inflating the ball thus formed with air under pressure, applying to the outer surface thereof layers of wear-resisting material, and finally curing the latter on under the combined action of pressure and heat.

ADDISON T. SAUNDERS.

Witnesses:
W. W. WALLACE,
F. E. WALLACE.